(12) United States Patent
Eitzenberger (10) Patent No.: US 11,181,219 B2
(45) Date of Patent: Nov. 23, 2021

(54) DEVICE FOR CONNECTING PIPE ENDS OF DOUBLE-WALLED PIPES

(71) Applicant: PFW Aerospace GmbH, Speyer (DE)

(72) Inventor: Berthold Eitzenberger, Ludwigshafen/Rhein (DE)

(*) Notice: Subject to any disclaimer, the term of this patent is extended or adjusted under 35 U.S.C. 154(b) by 224 days.

(21) Appl. No.: 16/345,530

(22) PCT Filed: Oct. 25, 2017

(86) PCT No.: PCT/EP2017/001257
§ 371 (c)(1),
(2) Date: Apr. 26, 2019

(87) PCT Pub. No.: WO2018/077473
PCT Pub. Date: May 3, 2018

(65) Prior Publication Data
US 2019/0309886 A1    Oct. 10, 2019

(30) Foreign Application Priority Data

Oct. 28, 2016   (DE) ...................... 10 2016 221 278.8

(51) Int. Cl.
| F16L 39/00 | (2006.01) |
| F16L 27/02 | (2006.01) |
| F16L 27/04 | (2006.01) |

(52) U.S. Cl.
CPC ........... *F16L 39/005* (2013.01); *F16L 27/026* (2013.01); *F16L 27/04* (2013.01)

(58) Field of Classification Search
CPC ......... F16L 27/02; F16L 27/026; F16L 27/04; F16L 27/06; F16L 27/053; F16L 39/00; F16L 39/04; F16L 39/005
(Continued)

(56) References Cited

U.S. PATENT DOCUMENTS

| 6,056,329 A | 5/2000 | Kitani et al. |
| 8,360,477 B2 | 1/2013 | Flynn |

(Continued)

FOREIGN PATENT DOCUMENTS

| DE | 19944247 A1 | 4/2001 |
| EP | 1363061 A1 | 11/2003 |

(Continued)

OTHER PUBLICATIONS

International Search Report Corresponding to Application No. PCT/EP0217/001257 dated Jan. 16, 2018.

(Continued)

*Primary Examiner* — Aaron M Dunwoody
(74) *Attorney, Agent, or Firm* — Dority & Manning, P.A.

(57) ABSTRACT

The invention relates to a device for connecting pipe ends (80, 82) of double-walled pipes (72, 74) for angular compensation and for length compensation of the relative movements of the double-walled pipes (72, 74) relative to a double-walled connector (10). On the double-walled connector (10), there are arranged concentrically with respect to one another first and second ball heads (20, 26). These are each sealingly engaged over by ball cages (52, 54). The ball cages (52, 54) are formed on double-walled attachments (46) of the double-walled pipe ends (80, 82). The sealing function for double-walled angular compensation and double-walled length compensation are configured so as to be decoupled from one another, and are therefore optimized, in the case of the device proposed according to the invention.

16 Claims, 6 Drawing Sheets

(58) Field of Classification Search
USPC .... 285/123.17, 123.16, 123.15, 121.2, 145.3
See application file for complete search history.

(56) References Cited

U.S. PATENT DOCUMENTS

| | | | |
|---|---|---|---|
| 9,366,370 B2 | 6/2016 | Courpet et al. | |
| 2003/0217778 A1* | 11/2003 | Challender | F16L 27/06 138/114 |
| 2010/0001512 A1* | 1/2010 | Breay | F16L 25/025 285/50 |
| 2013/0181441 A1* | 7/2013 | Courpet | F16L 27/12 285/145.1 |
| 2014/0117162 A1* | 5/2014 | Courpet | B64C 1/12 244/132 |
| 2016/0230912 A1 | 8/2016 | French et al. | |

FOREIGN PATENT DOCUMENTS

| | | |
|---|---|---|
| EP | 2548806 A1 | 1/2013 |
| EP | 2682659 A1 | 1/2014 |
| FR | 2961174 A1 | 12/2011 |
| GB | 1072466 A | 6/1967 |
| GB | 2066399 A | 7/1981 |

OTHER PUBLICATIONS

German Office Action Corresponding to Application No. 102016221278 dated Feb. 18, 2020.

* cited by examiner

DEVICE FOR CONNECTING PIPE ENDS OF DOUBLE-WALLED PIPES

RELATED APPLICATIONS

The present application is based upon and claims priority to PCT International Patent Application No. PCT/EP2017/001257, filed on Oct. 25, 2017, which claims priority to DE Patent Application Serial No. 10 2016 221 278.8, filed on Oct. 28, 2016, both of which are incorporated herein by reference in their entirety.

TECHNICAL FIELD

The present invention relates to a device for connecting pipe ends of double-walled pipes for angular compensation and for length compensation. The invention also relates to the use of the device in aircraft, in particular in pipe systems within structure parts, such as for example wings or fuselage sections of aircraft.

PRIOR ART

EP 2 682 659 A1 relates to a coupling device. The coupling means serves for the detachable connection of fluid-conducting pipe ends of pipes. Each of the pipe ends to be connected to one another is surrounded by a sleeve, on the circumference of which there are formed at least two ribs extending in a circumferential direction, between which ribs a first ring-shaped seal element is received. The first ring-shaped seal element is furthermore acted on by an inner sleeve. The coupling device known from EP 2 682 659 A furthermore comprises an outer sleeve, which is equipped with radially inwardly extending ribs or rib portions. These are arranged either with an axial spacing in relation to a further rib, running in ring-shaped fashion, of the sleeves, or in a depression which is formed within the sleeves. The axial depression is situated between said rib and a fourth rib extending in the circumferential direction.

The device as per EP 2 682 659 A1 permits the compensation of small angular tolerances between the connectors and the pipes connecting them together. An elastic, non-uniform deformation of the seal at an angle position of connector with respect to pipe end has the effect that the seal is caused to assume a circumferentially elongated oval form. The resulting different gap dimensions of the seal geometry, comprising seal groove and sealing surface on connector and pipe end, are compensated by means of the elastic deformation of the seal cross section. This entails a narrow limitation of the angular tolerances between connector and pipe end and a high level of wear at the seal, because this simultaneously also permits length compensation. This may result in leaks.

U.S. Pat. No. 8,360,477 B2 relates to a pipe end connector. Said document discloses a connection system for the sealed connection of two fluid-conducting lines having two or more displaceable mountings for maintaining a mechanical connection between the fluid-conducting lines and having an O-ring for maintaining a fluid seal between the two fluid-conducting lines. At one end of a first fluid-conducting line, there is formed a bracket with an inner surface which constitutes a seal surface. A number of sliding mountings is held in position by means of corresponding mounting channels on the outer surface of a second fluid-conducting line. The sliding mountings are in mechanical contact with an inner surface of the bracket, which is formed in the first fluid-conducting line. The O-ring ensures sealing contact with a seal surface which is defined as part of the inner surface of the first fluid-conducting line. To ensure electrical conductivity, an arrangement is provided which contacts both the first fluid-conducting line and the second fluid-conducting line.

Modern tendencies in development in the aviation industry are directed toward modern freight and passenger aircraft being equipped with more flexible structural components. This means that for example wings, which extend from the wing root at the fuselage of an aircraft to the wing tip, and fuselage portions are subject to much greater mechanical deformations in relation to previous design models. If a passenger or freight aircraft passes through turbulence, deflections of the wing tip in relation to the wing root of several metres may occur, for example. This places particularly high sealing demands on fuel lines running in the interior of wings. These must be designed so as to ensure both length compensation and angular compensation in the event of said movements of the wings and thus of lines within the wing. Furthermore, a fluid-tight connection must be ensured. For the fluid tight connection of lines or line portions, for example of fuel lines in the aircraft construction, use is nowadays made of connecting elements, which are also referred to as connectors. These constitute connections between double-walled pipes within structural components, such as for example fuselage sections of the wings. Such connectors are generally connected to structural components of the aircraft.

Furthermore, in current aviation applications, there is the demand for components or complete structural units manufactured by suppliers to have greater individual-part tolerances and greater assembly tolerances, such that a faster assembly process during the manufacture of aircraft at the final assembly stage is possible. It would thus be possible for the assembly times involved in the final assembly of aircraft or aircraft components to be considerably shortened.

PRESENTATION OF THE INVENTION

The present invention is based on the object of providing a device for connecting pipe ends of double-walled pipes with angular compensation and length compensation in the event of relative movement of the pipes with respect to one another, which device firstly permits greater individual-part tolerances and, with regard to the complete structural unit, greater assembly tolerances, and secondly, with corresponding leak-tightness, ensures greater deflection angles between the lines or line portions to be connected and length compensations in the event of relative movement of the lines or line portions to be connected to one another in fluid-tight fashion.

On the device proposed according to the invention for connecting pipe ends of double-walled pipes, between two pairs of ball heads and ball cages which are positioned concentrically with respect to one another, there are received sealing elements which, in the event of deflection of pipe ends relative to the connecting element or connector connected to the structure, undergo a constant uniform deformation. This firstly promotes minimum wear of the sealing elements used, while maintaining maximum angular mobility for the compensation of intense relative movements between the pipe ends, which are to be connected to one another in fluid-tight fashion, of double-walled pipes, and secondly permits greater individual-part tolerances and assembly tolerances of the complete structural unit. In addition to angular compensation, the device proposed according to the invention for connecting pipe ends of double-walled pipes is capable, even in the event of changes in length of the pipe ends, that is to say of compensating a movement of the pipe ends out of attachment parts which are connected to the connector, without the sealing function being impaired.

Following the solution proposed according to the invention, the device or the connector has first and second ball heads which are positioned concentrically in relation to one another on the connector of double-walled design. The ball concentricity permits an angularly movable sealing action of the sealing partners without a deformation of the elastic seal material of the seals occurring.

In a refinement of the solution proposed according to the invention, the double-walled connector comprises fastening elements by means of which the double-walled connector is connected to a structure, in particular to a structure of an aircraft. Said fastening elements may surround the body of the connector, which is for example in tubular form, and have openings at their underside, by means of which the double-walled connector is connected to the structure, that is to say a fuselage section or a wing section of an aircraft.

In one advantageous design variant, it is possible for the first ball heads to be formed on the double-walled connector, that is to say for the first ball heads to be formed as a single piece with the double-walled connector. It is also possible for the first ball heads to be designed as separate components, which would then have to be connected to a correspondingly configured double-walled connector body. The first ball heads may also be separate components. An integrated, that is to say single-piece design of the ball heads has cost advantages, because a securing means can be omitted. With the use of only one central seal, it is also possible for relatively wear-resistant material to be omitted. Central seals permit a relatively large manufacturing tolerance, because an axial displacement has, from a geometrical aspect, a small influence on the maintaining of the sealing action.

In a refinement of the solution proposed according to the invention, the second ball heads are arranged on the outer circumference of the double-walled connector so as to be adjustable in an axial direction. Here, the second ball heads may have sleeve-shaped projections which comprise an internal thread which interacts with a corresponding external thread formed on the outer circumference of the double-walled connector, such that an axial adjustment of the second ball heads relative to the connector body is possible.

In a refinement of the solution proposed according to the invention, a first and a second clamping ring are pre-installed on the double-walled connector, such that the first and the second clamping ring engage over the ball heads arranged on the body of the double-walled connector.

With the clamping rings, an optimum axial preload of sealing elements can be achieved whilst centring of a ball cage which engages over the second ball heads is realized.

In a further embodiment of the solution proposed according to the invention, the first and the second clamping ring may be manufactured from a material which has sliding characteristics. This offers the advantage that a sealing element on the clamping ring can be omitted. Use may be made of various plastics which exhibit good sliding characteristics along with chemical resistance with respect to fuel. Examples are PA66 or PEEK, and also a coating of the metallic clamping ring with PTFE (Teflon) or similar material is possible in order to replace a sealing element.

In a refinement of the solution proposed according to the invention, the first and the second clamping ring may be of closed design in a circumferential direction, or the first and the second clamping ring may have two or more segments which are radially separate from one another. A clamping ring composed of two or more radially separate segments may also be pre-installed on the connector retroactively with respect to the ball head. A closed clamping ring has an inner diameter smaller than the outer diameter of the outer ball head and, for this reason, is preferably used on the connector head during the course of the preassembly for the system installation.

In a refinement of the solution proposed according to the invention, the double-walled connector may be manufactured from aluminum, the second ball heads may be manufactured from titanium, the first and the second clamping ring and double-walled attachments may be manufactured from PEEK. In the event of an action of force owing to forces acting on the pipes during aircraft accelerations or during aircraft deformations, said forces are dissipated via the surface of the outer ball head to the connector into the aircraft structure. If the forces acting in an axial direction on axial stops are very high, the seals may be loaded to such an extent that the outer ball cage makes contact with the outer ball head, without this also needing to be the case at the inner elements too. Since the surface of the ball heads also promotes the leak-tightness, no wear, and consequently also no corrosion, may occur here. For this reason, the stator components are manufactured from titanium or rust-resistant steel, because these materials do not require a coating as surface protection. For weight reasons, the use of titanium is advantageous.

In a refinement of the solution proposed according to the invention, the double-walled pipe ends to be connected to one another by means of the connector may be equipped with double-walled attachments which comprise an outer part and an inner part.

In the outer part and in the inner part, there are formed in each case one first and one second ball cage, which engage over the first and second ball heads.

In a refinement of the solution proposed according to the invention, a first ball cage is formed with a sealing ring in the inner part, whereas a second ball cage with two sealing rings or one sealing ring and one guide ring is situated in the outer part. Here, the sealing ring situated closer to the connector performs the function of a guide ring.

Furthermore, a first guide ring and, axially spaced apart therefrom, a further sealing ring are situated on the outer circumference of the inner part.

In the joined state of the outer part and of the inner part of a double-walled attachment, a perforated disc which is arranged on the inner part and which is equipped with a multiplicity of openings delimits an insertion space for a double-walled pipe end, wherein the insertion space is delimited between the inner wall of the outer part and the outer wall of the inner part.

In a refinement of the solution proposed according to the invention, the second ball cages are concentrically positioned and braced relative to the second ball heads by means of a sealing ring and a guide ring with a smaller diameter than the second ball heads. This configuration advantageously has the effect that the installation positions are not concentric with respect to the ball, but are axially offset with respect to one another. In this way, the sealing rings that are guided in the outer ball cage or in the clamping ring can slide axially over the ball head situated at the outside, and thus transmit all axial forces in every angular position. At the same time, the sealing function is maintained, because two axially braced sealing rings also force the concentric position of the inner sealing ring with respect to the ball, because the inner ball cage is fixedly connected to the outer ball cage and thus the primary sealing action of the system against leakage is ensured. Fuel flows only in the inner primary pipe; the outer pipe of the multi-walled pipe assembly serves for drainage and thus for safety.

In a refinement of the solution proposed according to the invention, the first ball cages receive in each case one first sealing element, which has a diameter identical to a diameter of the first ball head. By means of this sealing element, deviations with regard to the concentricity between the second ball head with respect to the first ball head can be compensated. This advantageously results in only small geometrical effects and at most slight influencing of the sealing function.

The first and second clamping rings preload the sealing ring and the guide ring in an axial direction, and centre the second ball cages in relation to the second ball heads.

The invention furthermore relates to a use of the device for connecting pipe ends of double-walled pipes and for angular compensation and for length compensation in an aircraft, in particular for fastening to structural components such as wings or fuselage sections of aircraft, be it passenger aircraft, be it freight aircraft.

Advantages of the Invention

By means of the connectors of double-walled form proposed according to the invention, it is possible for double-walled pipe ends, equipped with double-walled attachments, of double-walled pipes to be connected to one another such that maximum angular mobility can be achieved, wherein seal elements preferably in the form of sealing rings are always subject to constant uniform deformation. This ensures a minimization of wear over the service life of the double-walled connectors. Furthermore, the double-walled connectors proposed according to the invention are capable of compensating axial movements of pipe ends relative to double-walled attachments surrounding the pipe ends, wherein, during the relative movement, the sealing function is maintained and a fluid transfer remains ensured through an outer, second flow cross section delimited by the double wall. Furthermore, the solution proposed according to the invention for double-walled connectors offers the advantage that greater individual-part tolerances are admissible, and greater assembly tolerances of the complete structural unit during the system construction in the aircraft can be permitted.

The connectors proposed according to the invention can be fully installed without measurement of their position and orientation on the aircraft structure, which itself may exhibit large tolerances without the need for the connector positions and connector orientations to be corrected once again, for the system installation of the pipes to be connected, in order to adhere to angular or position limit values for the seals. Owing to this characteristic, with the use of the device proposed according to the invention, the system installation during the final assembly of aircraft is considerably simplified.

DRAWINGS

The invention will be described in more detail below on the basis of the drawings, in which.

DESIGN VARIANTS

Figure 1:
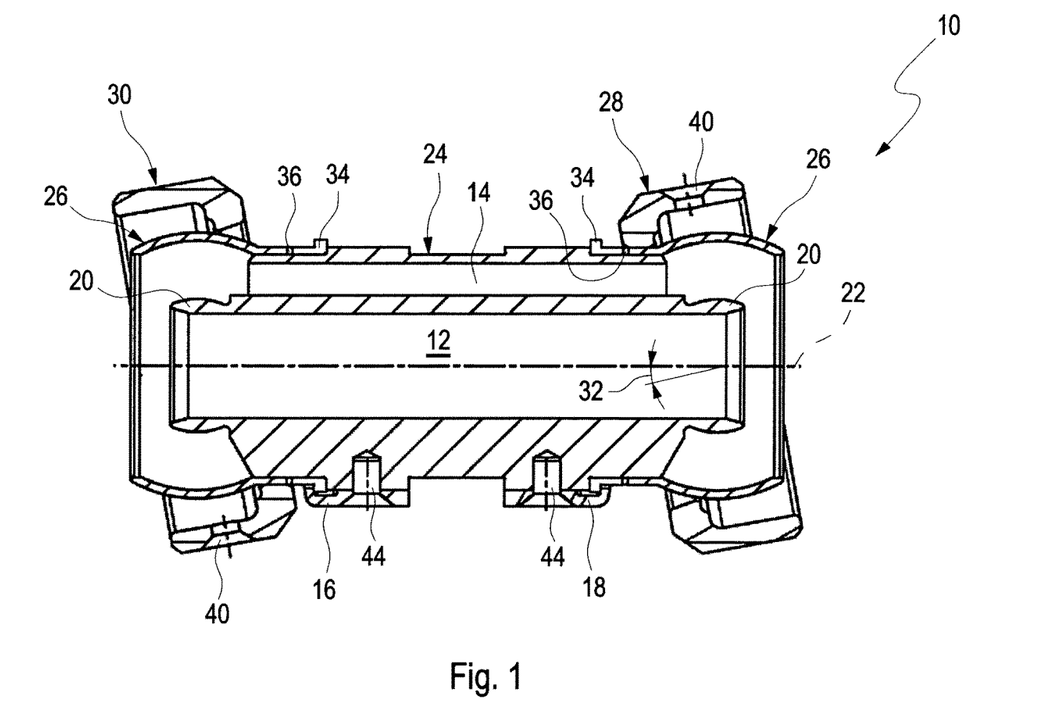
FIG. 1 shows a section through a double-walled connector proposed according to the invention with first and second ball sets formed thereon.

The illustration in FIG. 1 shows a section through a double-walled connector, proposed according to the invention, of a device for connecting pipe ends of double-walled pipes.

As can be seen from the illustration in FIG. 1, a double-walled connector 10 has a first flow cross section 12 and a further, second flow cross section 14. The further, second flow cross section 14 is defined by a multiplicity of channels which extend in a circumferential direction around a centreline 22 of the double-walled connector 10. Situated opposite the second flow cross section 14 illustrated in FIG. 1 is a fastening portion 24 to which a fastening element 16 and a further fastening element 18 are fastened. By means of the fastening elements 16, 18, which will be described in more detail below, the double-walled connector 10 can be fastened to a structure, for example in the interior space of a wing or in a fuselage section of a passenger or freight aircraft. The double-walled connector 10 illustrated in section in FIG. 1 is manufactured for example from aluminum.

The double-walled connector 10 furthermore comprises first ball heads 20. The first ball heads 20, which are formed opposite one another, may for example be integrated into the body of the double-walled connector 10, that is to say formed as a single piece therewith; the first ball heads 20 may furthermore also be manufactured as separate components and retroactively joined to the body of the first double-walled connector 10. Both design variants are possible.

Second ball heads 26 are formed concentrically with respect to the centreline 22 of the double-walled connector 10 and so as to engage over the first ball heads 20. Said second ball heads have a greater diameter than the first ball heads 20 and are arranged on the outer circumference of the double-walled connector 10, preferably joined thereto by means of a thread, and accordingly adjustable in an axial direction. The second ball heads 26, which are likewise arranged opposite one another in relation to the double-walled connector 10, comprise sleeve-shaped projections, in which a thread is formed, and a stop 34 of rectangular form. The second ball heads 26 which have said sleeve projections are joined to the circumference of the double-walled connector 10 by an axial securing means 36.

The second ball heads 26 are preferably manufactured from a material such as for example titanium.

As can also be seen from the sectional illustration in FIG. 1, the two second ball heads 26, situated at the outside, are each engaged over by a first clamping ring 28 and a second clamping ring 30. Owing to the fact that the clear diameter of the first and second clamping rings 28, 30 is smaller than the outer diameter of the second ball heads 26, said clamping rings are pre-installed on the double-walled connector 10 before the second ball heads 26 are installed on the double-walled connector 10. It can be seen from the illustration in FIG. 1 that the first clamping ring 28 and the second clamping ring 30 are mobile in relation to the mutually oppositely situated second ball heads 26, that is to say are movable relative thereto and are thus movable around the second ball heads 26 correspondingly to a first angular offset denoted by the reference designation 32. In the sectional illustration in FIG. 1, the first angular offset 32 is illustrated in relation the centreline 22 of the double-walled connector 10.

Figure 2:
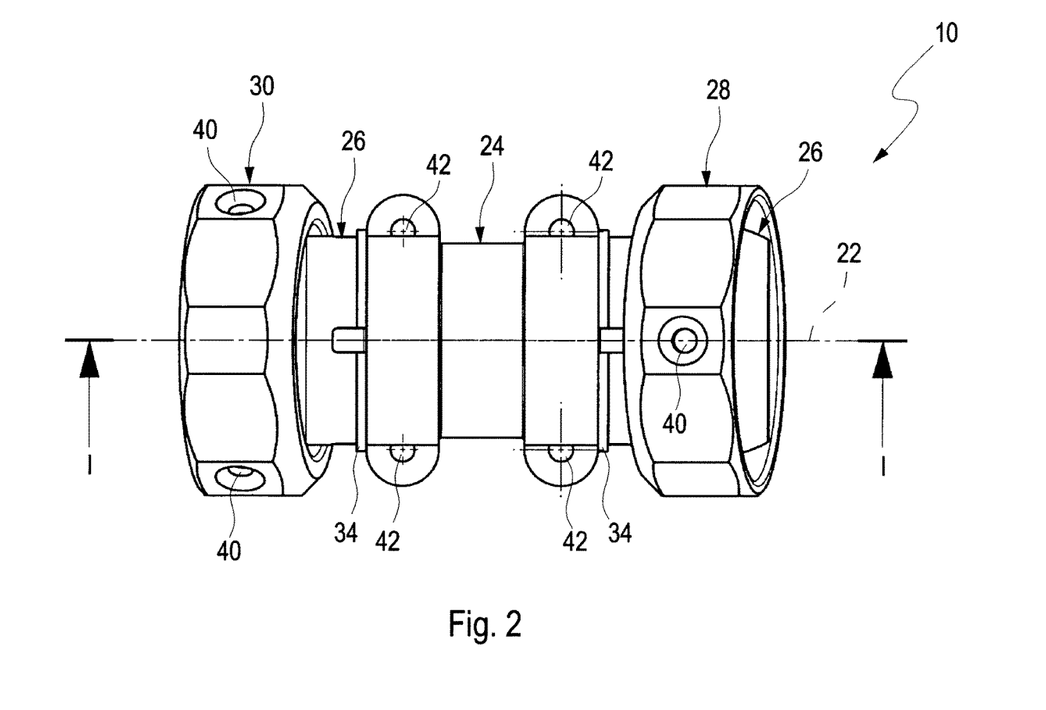
FIG. 2 shows a view of the double-walled connector as per FIG. 1 from the bottom side.

In the illustration in FIG. 2, the double-walled connector illustrated in section in FIG. 1 is shown in a plan view from above.

It can be seen from the plan view in FIG. 2 that the body of the double-walled connector 10 is in each case surrounded by the fastening elements 16, 18. The fastening openings 42 permit the fastening of the double-walled connector 10 to a structure, for example in the interior space of a wing or in the interior space of a fuselage section of an aircraft. From the plan view in the illustration in FIG. 2, it can also be seen that the first and the second clamping ring 28, 30 each have openings 40. The openings 40 serve for receiving securing means 84, cf. FIG. 7. The openings 40 are bores or depressions which serve for receiving securing elements 84, for example countersunk screws. To secure a thread setting once it has been set, and thus a relative position between the components, the components 30 and 46 are connected radially by means of three securing elements, for example securing countersunk screws 84. This serves in particular for fixing the axial position of a second guide ring relative to the second ball head, situated at the outside, such that an optimum position, centrally with respect to the ball, of all components in relation to one another is ensured.

It can also be seen from the plan view in FIG. 2 that, in this design variant, the two clamping rings 28, 30, which engage over the second ball heads 26, are formed as a single piece, that is to say so as to be closed, in a circumferential direction. As a design variant, it is possible for the first clamping ring 28 and the second clamping ring 30 to be formed from at least two or even more segments which are separated from one another in a radial direction.

It can be seen from the plan view in FIG. 2 that, on the circumference of the double-walled connector 10, the two second ball heads 26, which have a sleeve projection, are situated opposite one another.

Whereas the double-walled connector 10 is preferably manufactured from a material such as aluminum, the second ball heads 26 with their respective sleeve projections may be manufactured from titanium. As a material for manufacturing the first clamping ring 28 and the second clamping ring 30, a material such as PEEK is preferably selected. The material such as for example PEEK also has the function of a defined high-resistance electrical conductivity, in order to be able to dissipate a possibly occurring electrostatic charge of the pipe ends in a controlled manner. For this purpose, the pipes or pipe ends are connected to ball sleeves via a bonding cable, which is not illustrated. The function of the dissipation could also be realized by means of a wound glass fibre material for example with a soot additive in the matrix thereof. From the illustration in FIG. 2, it can also be seen that the stops 34 of the sleeve projections of the second ball heads 26 bear against the fastening elements 16, 18, which extend in a circumferential direction over the body of the double-walled connector 10.

Figure 3:
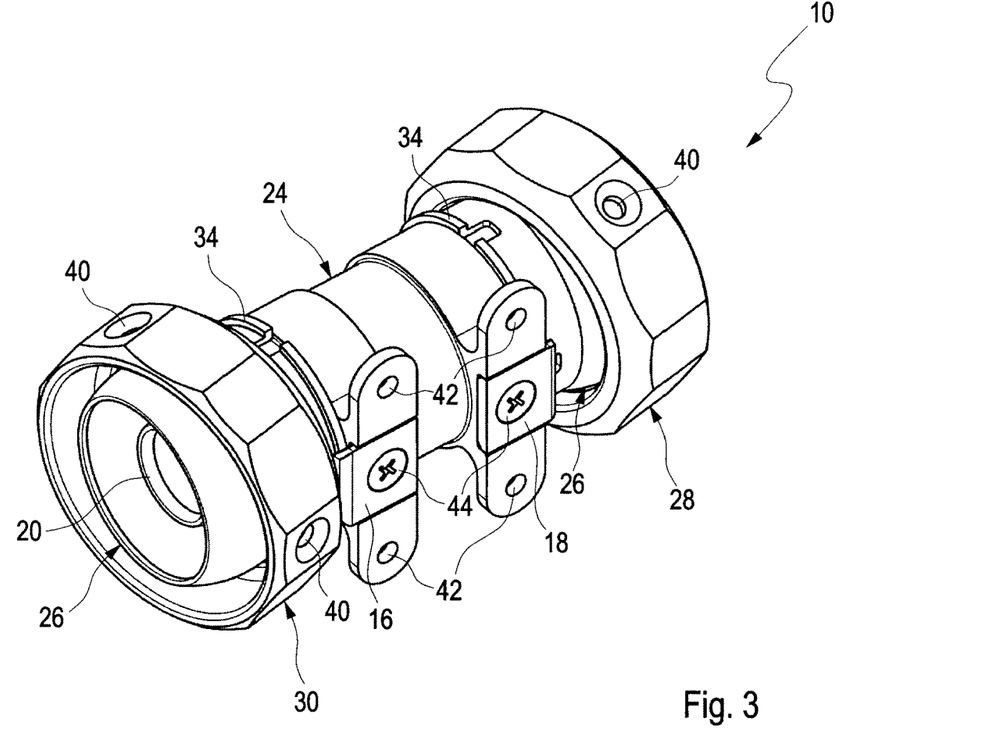
FIG. 3 shows a perspective plan view of the double-walled connector proposed according to the invention in a perspective illustration.

FIG. 3 shows a perspective view of the double-walled connector from the bottom side.

It can be seen from FIG. 3 that, by means of fixing screws 44 which are screwed into the fastening portion of the double-walled connector 10, the fastening elements 16, 18 are connected to said double-walled connector. The double-walled connector 10 itself is connected by means of the fastening openings 42, which are illustrated in the view in FIG. 3, to a structure which is not illustrated in FIG. 3, for example a wing or a fuselage section of an aircraft. Consequently, the double-walled connector 10 is rigidly connected to the structure, whereas the clamping rings 28, 30 and components connected thereto remain movable relative to the double-walled connector 10. It can also be seen from the perspective illustration in FIG. 3 that the second ball heads 26 are each engaged over by the first clamping ring 28 and by the second clamping ring 30.

Figure 4:
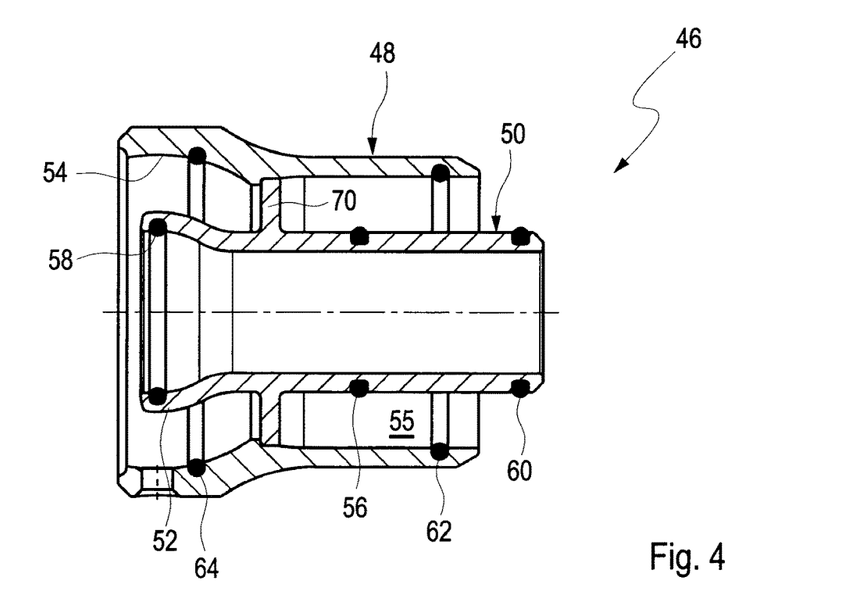
FIG. 4 shows a section through a double-walled attachment.

The illustration in FIG. 4 illustrates a double-walled attachment, comprising an outer part and an inner part joined thereto, in section.

From the illustration in FIG. 4, it can be seen that a double-walled attachment 46 comprises an outer part 48 and a tubular inner part 50 joined to said outer part. A first ball cage 52 is formed in the inner part 50. A second ball cage 54 which surrounds the first ball cage 52 is formed in the outer part 48 of the double-walled attachment 46. In the illustration in FIG. 4, the outer part 48 and the inner part 50 are illustrated in the joined state. In the joined-together state in FIG. 4, an insertion space 55 is delimited by the outer part 48, the outer circumference of the inner part 50 and a perforated disc 70. One side of the insertion space 55 is open for receiving a double-walled pipe end 80, 82 (see FIGS. 8 and 9) which is not illustrated in FIG. 4. From the sectional illustration in FIG. 5, it can be seen that the first ball cage 52 receives a first sealing ring 58. Furthermore, a second sealing ring 60 is arranged on the outer circumference of the inner part 50. A first guide ring 56, which is likewise arranged on the inner part 50, is situated so as to be axially spaced apart from said second sealing ring.

In the outer part 48 or on the inner side thereof, a fourth sealing ring 64 is situated within the second ball cage 54, whereas, in the region of the insertion space 55, a third sealing ring 62 is arranged at the inside on the inner side of the outer part 48.

Figure 5:
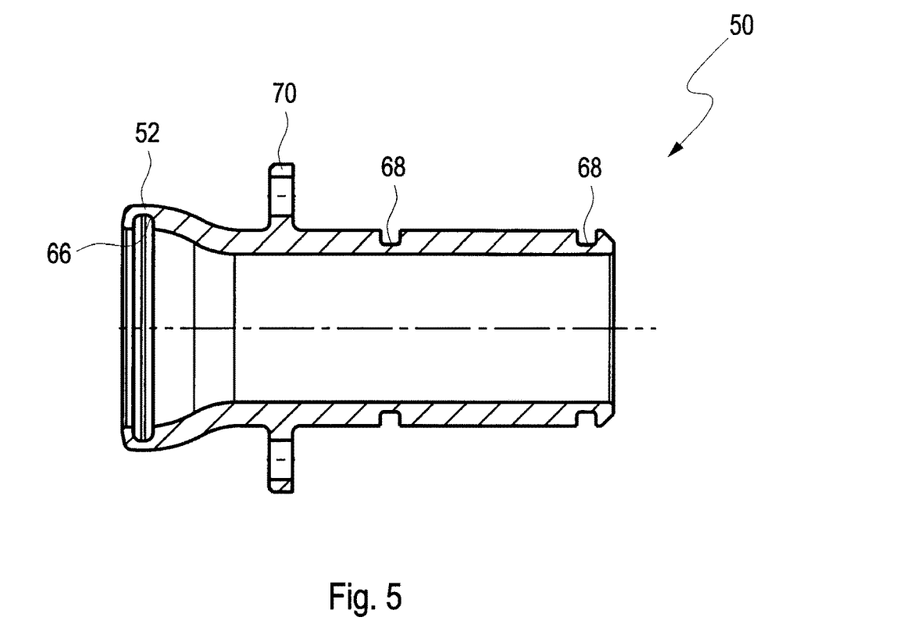
FIG. 5 shows a section through an inner part of the double-walled attachment.

FIG. 5 shows a sectional illustration of the inner part 50 of the double-walled attachment.

From the sectional illustration in FIG. 5, it can be seen that multiple grooves 68 are formed on the outer circumference of the inner part 50 for receiving the sealing and/or guide elements 56, 60. The first sealing ring 58 is inserted into a groove 66 on the inner side of the first ball cage 52. In FIG. 5, on the outer circumference of the inner part 50, there is situated a perforated disc 70 which, as viewed in a circumferential direction, has multiple openings 70 situated adjacent to one another.

Figure 6:
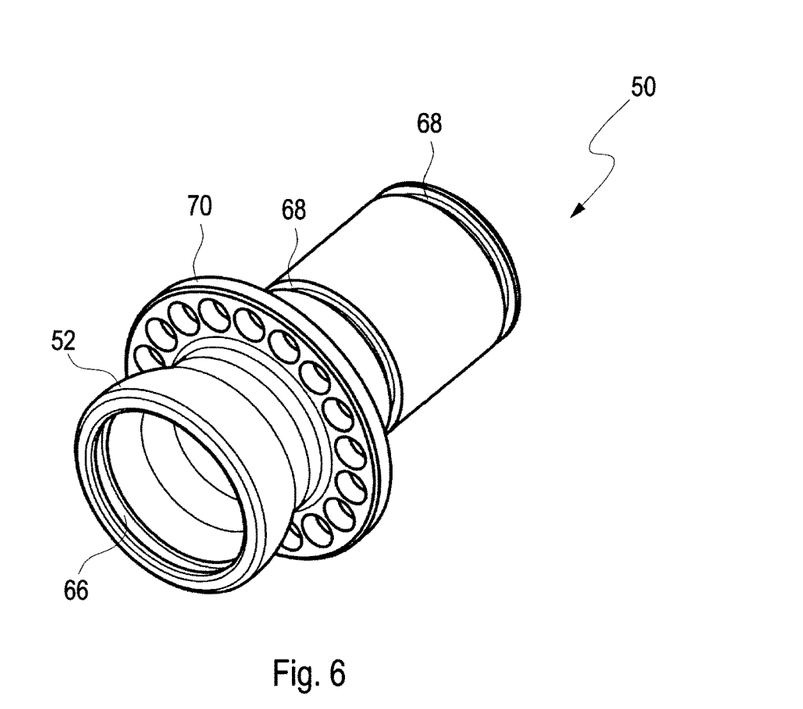
FIG. 6 shows a perspective view of the inner part of the double-walled connector with a perforated disc, which has a multiplicity of openings, attached to the outer circumference.

FIG. 6 shows a perspective view of the inner part, illustrated in section in FIG. 5, of the double-walled attachment.

From the perspective illustration in FIG. 6, it can be seen that the encircling groove 66 for receiving the first sealing ring 58 runs on the inner side of the first ball cage 52. The perforated disc 70, which is situated on the outer circumference of the inner part 50, has, as viewed in a circumferential direction, multiple bores which permit a fluid transfer in a second flow cross section 14 which surrounds a first flow cross section 12 in the double-walled connector 10. From the perspective illustration in FIG. 6, it can also be seen that the grooves 68 for receiving the second sealing ring 60 and the first guide ring 56 are situated on the inner part 50.

Figure 7:
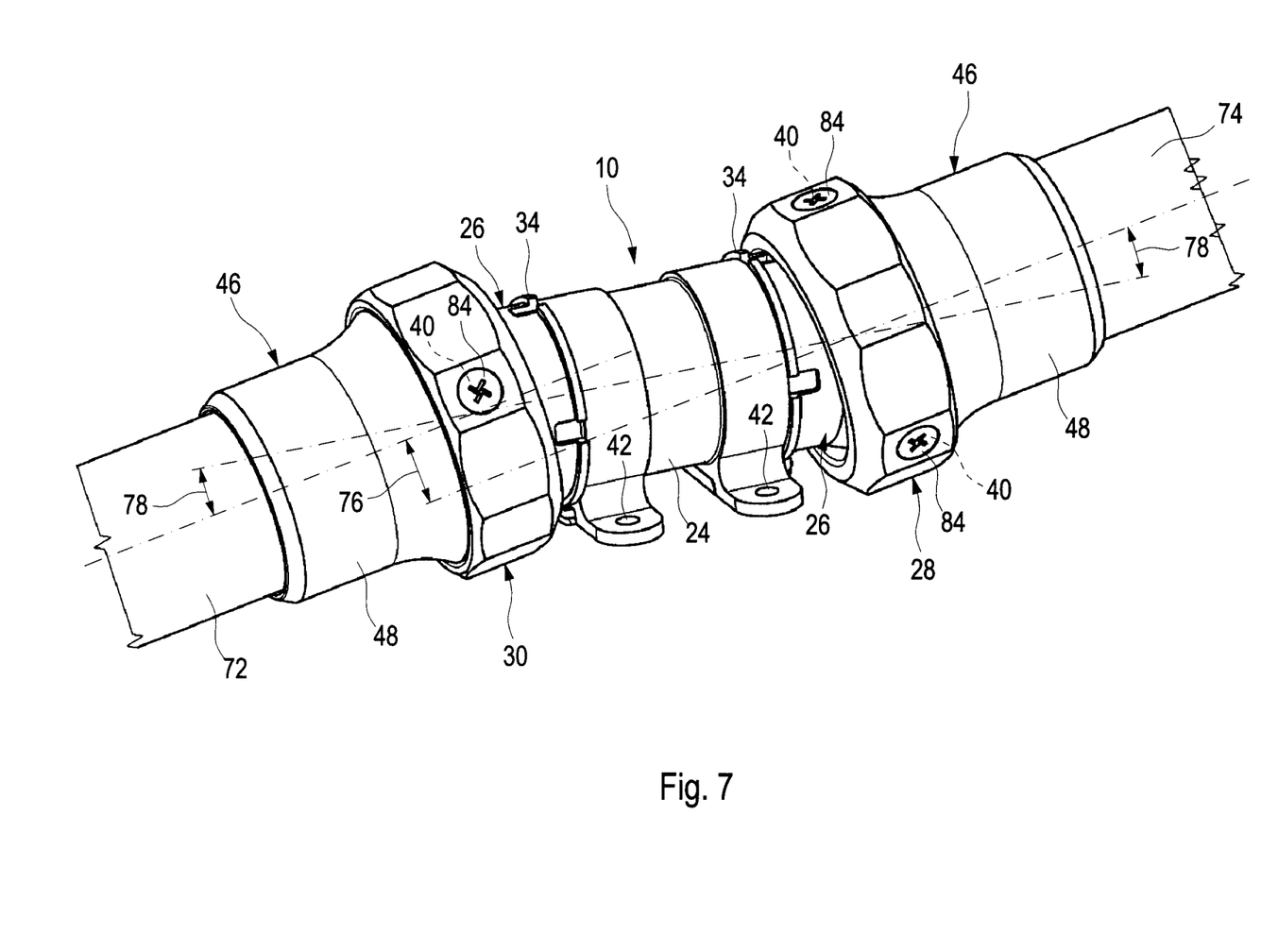
FIG. 7 is a perspective illustration of double-walled pipes which have been connected by means of double-walled attachments to the double-walled connector proposed according to the invention and which are illustrated in a deflected position.

FIG. 7 shows a perspective illustration of an assembly composed of double-walled connector, two double-walled attachments and two double-walled pipes received in said double-walled connector.

The double-walled connector 10, which in the illustration in FIG. 7 is connected to a structure (not illustrated here), for example to a wing interior space or to an interior space of a fuselage section of an aircraft, constitutes a rigid component of the assembly illustrated in a deflected position in FIG. 7. The attachments 46 of double-walled design are illustrated in a deflected position and have an angular offset 78 in relation to the rigidly arranged double-walled connector 10 of the assembly illustrated in FIG. 7. The double-walled attachments 46 in turn surround a first double-walled pipe 72 and a second double-walled pipe 74, more specifically the double-walled pipe ends 80, 82 thereof (see the illustrations in FIGS. 8 and 9).

On the circumference of the double-walled connector 10, the sleeve projections of the two second ball heads 26 are each situated with their stops 34 in abutment against the fastening elements 16 of the double-walled connector 10 to the structure which is not illustrated in FIG. 7. In addition to the angular offset 78 of the double-walled pipes 72, 74 relative to the double-walled connector 10, the two double-walled pipes 72 have a line offset 76 relative to one another. In the illustration in FIG. 9, the angular offsets 78 are oriented oppositely to one another.

For the centring of the second ball cage 54 with respect to the second ball head 26, during the installation of the second ball head 26 on the double-walled connector 10, a clamping ring 28, 30 must be pre-installed between the second ball head 26 and the double-walled connector 10, because the smallest clear inner diameter of the first and second clamping rings 28, 30 for their function of the axial preloading of the two sealing and/or guide rings 64, 88 must be smaller than the greatest outer diameter of the second ball head 26. The first and second clamping rings 28, 30, comprising two or more radially separate segments, may also be pre-installed retrospectively on the double-walled connector 10. The number of segments however gives rise to a correspondingly increased risk of failure compared with the risk of failure which has enclosed as a designed clamping ring 28, 30.

The positioning of the first ball cage 52 in relation to the first ball head 20 on the double-walled connector 10 ensures, by means of fixed connection or integration of the inner angle arm with respect to the outer angle arm, which itself, with the second ball cage 54 with the two sealing or guide rings 64, 88, which are braced axially relative to one another, received therein, is centred relative to the second ball head 26. Since the second ball head 26 is positioned in axially adjustable fashion concentrically with respect to the first ball head 20, this likewise applies to all other elements of the angular compensation by means of the first and second ball cages 52, 54 and the said sealing rings 58, 60, 62, 64. The solution according to the invention permits a transmission of bending moments from double-walled pipes 72, 74 to the double-walled connector 10 via multiple sealing rings 58, 60, 62, 64 which have an axial offset, and which furthermore permit sealed length compensation over an axial clearance with abutment for the end of the pipe in the angular space.

Securing of the second ball head 26 in relation to the double-walled connector 10 is realized by means of one or more axially connecting securing elements which are installed in the body of the double-walled connector 10. Securing of the first and second clamping rings 28, 30 to the double-walled attachments 46 is realized by means of one or more radially connecting securing elements 84.

By means of an axial thread, the second clamping ring and the double-walled attachment 46 are positioned relative to one another. To secure the selected thread setting, the second clamping ring 30 and the double-walled attachment 46 are radially connected by three securing means 84, for example countersunk screws. This securing method serves in particular for fixing the axial position of the second guide ring 88 in relation to the second ball head 26 such that the optimum concentric position of all individual parts relative to one another is forced without exceeding the admissible pressure forces of the seals.

Figure 8:
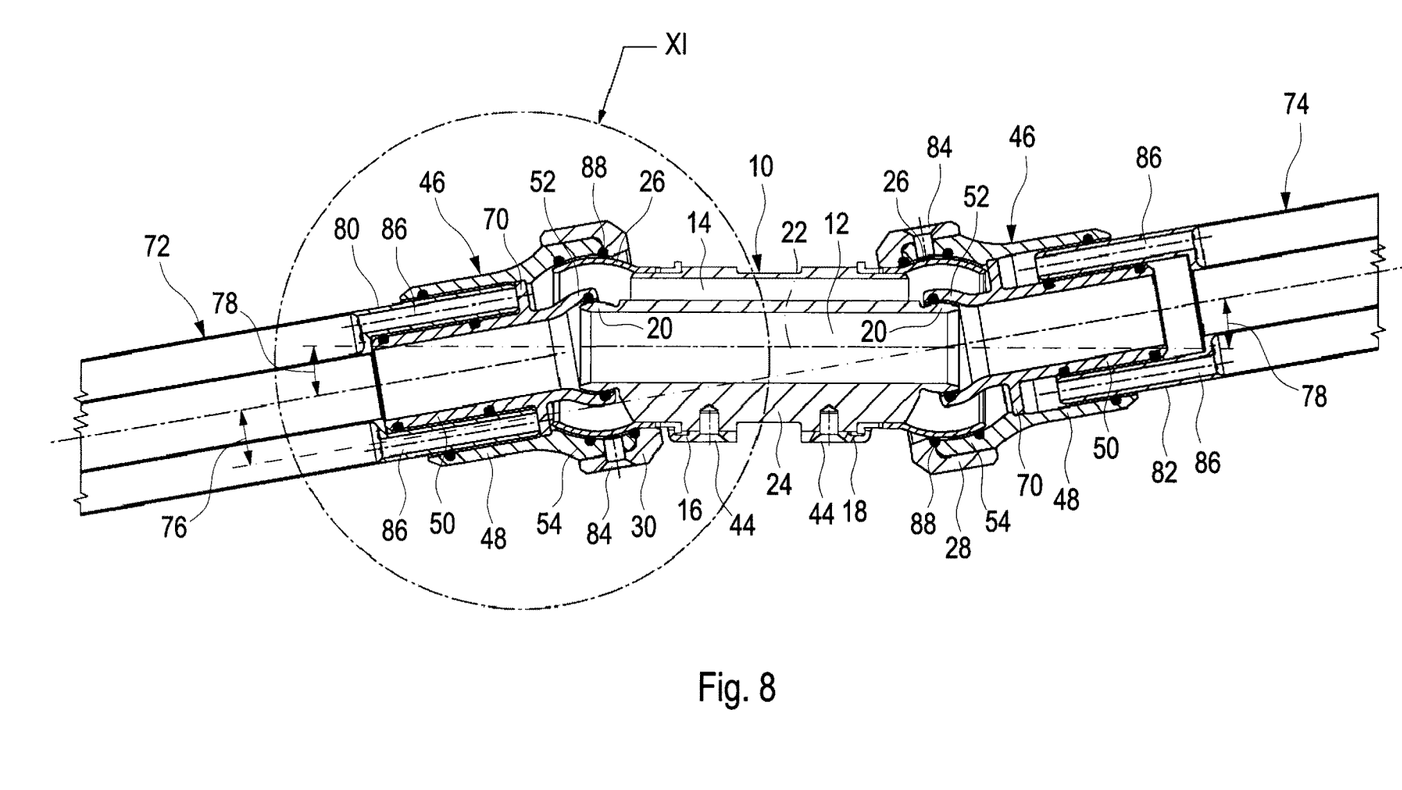
FIG. 8 shows a section through the joined arrangement of double-walled pipes, double-walled attachments and a double-walled connector with illustrated deflections and sealing elements.

The illustration in FIG. 8 shows a section through the assembly, shown in a perspective illustration in FIG. 7, composed of double-walled connector and two pipe ends of double-walled pipes, which are each equipped with a double-walled attachment.

FIG. 8 shows that the double-walled connector 10 has the first flow cross section 12, which is of tubular form and which runs symmetrically with respect to the centreline 22. The first flow cross section 12 is surrounded by the second flow cross section 14 which—although not illustrated in FIG. 8—extends in a circumferential direction in the body of the double-walled connector 10. Situated on the outer circumference of the double-walled connector 10 are the two fastening elements 16, 18, each equipped with fixing screws 44, means of which the double-walled connector 10 can be connected rigidly to structural components such as for example a wing or a fuselage section of an aircraft.

It can be seen from the illustration in FIG. 8 that the first ball heads 20 are each engaged over by first ball cages 52. On the inner side of the first ball cages 52, there is situated the first sealing ring 58, by means of which the articulated connection between the first ball heads 20 and the inner parts 50 of the double-walled attachments 46 is sealed off. It can be seen from the illustration in FIG. 8 that the double-walled pipe ends 80 and 82 are situated with an angular offset 78 in relation to the centreline 22 of the first flow cross section 12.

The outer parts 48 of the double-walled attachments 46 are reloaded in each case by the first clamping ring 28 and the second clamping ring 30. A second guide ring 88 and the fourth sealing ring 64 centre the outer part 48, which is preloaded by the first and second clamping rings 28, 30, with the second ball cage 54 on the second ball heads 26.

From the sectional illustration in FIG. 8, it can also be seen that double-walled pipes 72, 74 are each inserted with their double-walled pipe ends 80 and 82 into the joined-together outer parts 48 and inner parts 50 of the double-walled attachments 46. In each case a number of channels 86, which form a type of channel bundle, run in the double-walled pipe ends 80 and 82. The openings of the channels 86 are aligned with the openings of the perforated disc 70 which is formed on the inner part 50 of the double-walled attachment 46, such that a fluid passage is ensured as a result of the connection between the double-walled attachment 46 and the two flow cross sections 12 and 14 of the double-walled connector 10, which fluid passage is sealed off to the outside by the sealing elements in the form of said sealing rings.

The angular offset 78 indicated in the illustration in FIG. 8 may amount to ±8° in both directions without the leak-tightness of the fluid connection between the double-walled connector 10 and the two double-walled attachments 46 and the double-walled pipe ends 80, 82 thereon exhibiting leakage.

Figure 9:
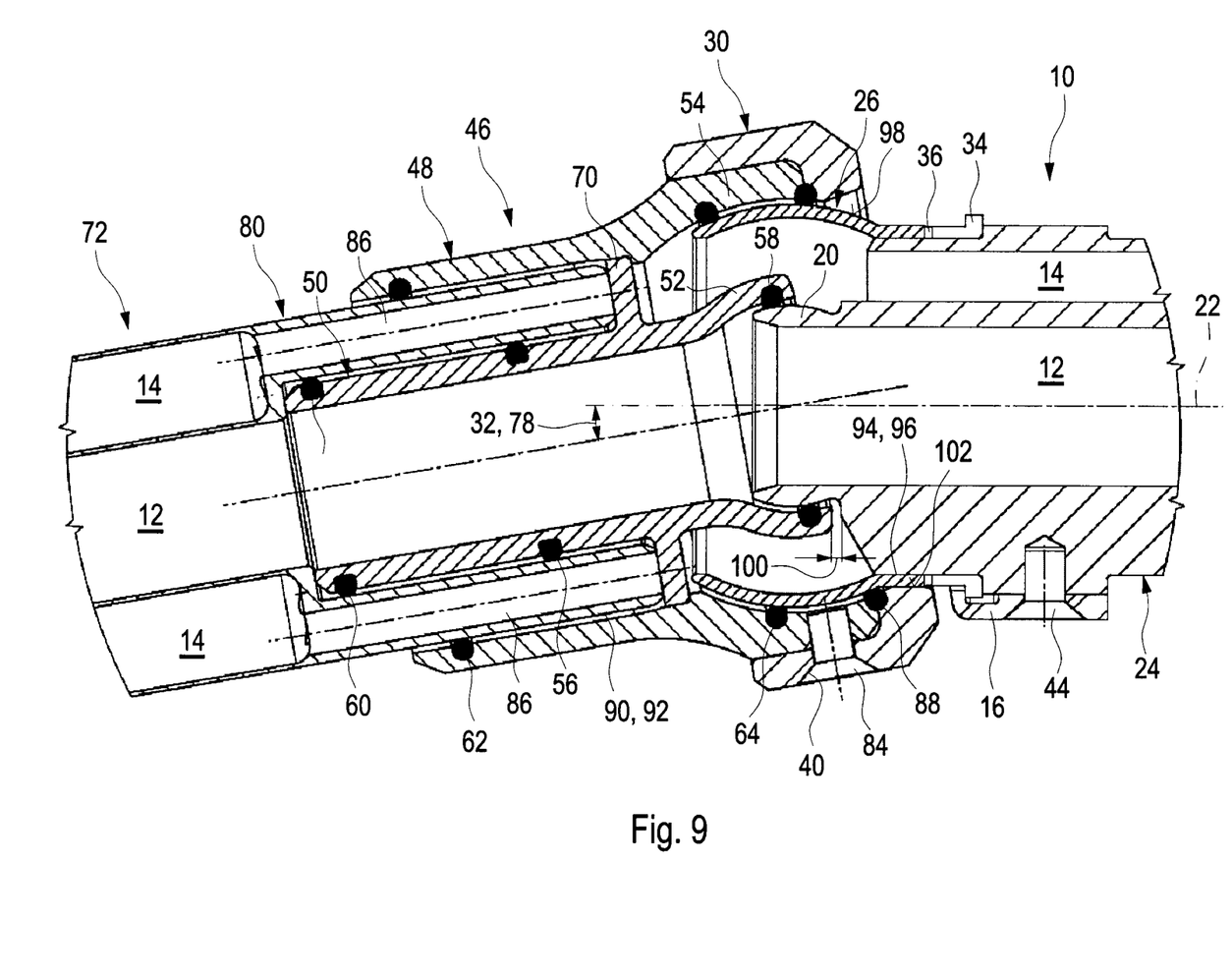
FIG. 9 shows a detail, in an enlarged illustration, of a connection between the double-walled connector and the double-walled attachment part, in which a pipe end of a double-walled pipe is received.

The illustration in FIG. 9 shows, on an enlarged scale, the sealing connection between the double-walled connector 10 and the first double-walled pipe end 80 of the first double-walled pipe 72.

FIG. 9 shows that the first double-walled pipe 72 comprises a number of channels 86 in the region of its first double-walled pipe end 80. Said channels 86 at the first double-walled pipe end 80 are inserted into the insertion space 55, illustrated in FIG. 4, of the double-walled attachment 46. The first guide ring 56 serves for guiding the pipe end of the first double-walled pipe end 80 on the outer circumference of the inner part 50, whereas the second sealing ring 60 performs a sealing function. FIG. 9 shows that, in the joined state, the first double-walled pipe end 80 is engaged over by the outer part 48 of the double-walled attachment 46. The seal between said components is realized by means of a third sealing ring 62. In FIG. 9, the connection between the double-walled connector 10 and the first and second ball heads 20, 26 formed thereon is illustrated in the deflected state, see positions 32, 78 in relation to the centreline 22 of the double-walled connector 10. In the deflected position illustrated in FIG. 9, the sealing and the centring are performed by the first sealing ring 58, which is situated on the inner side of the first ball cage 52. The sealing function in relation to the second ball cage 54 is performed by the fourth sealing ring 64 which runs on the second ball head 26 and which is movable relative thereto, whereas the second guide ring 88 between the second clamping ring 30 and the outer part 48 of the double-walled attachment 46 performs only a guidance function.

The second ball head 26, equipped with a sleeve-like projection, is received on the outer circumference of the double-walled connector 10. In the axial position of the second ball head 26 illustrated in FIG. 9, the stop 34 bears against the fastening element 16, which extends along the outer circumference of the body of the double-walled connector 10. The fastening element 16, by means of which the double-walled connector 10 can be fastened rigidly to a structure such as a wing or a fuselage section of an aircraft, is connected by means of fixing screws 44 to the fastening portion 24 of the double-walled connector 10.

An axial adjustment of the second ball heads 26 relative to the connector 10 is realized by means of an external thread 94, which is formed on the double-walled connector 10, and an internal thread 96 with which the sleeve projection of the second ball head 26 is equipped. Preferably, the external thread 94 and the internal thread 96 are formed as fine threads. An adjustment of the external thread 94 relative to the internal thread 96 is realized by means of a hook wrench and protuberances 34. From the sectional illustration in FIG. 9, the securing means 84 designed as a countersunk screw can be seen, which is recessed into the second clamping ring 30. On the latter, the securing means 84 in the form of countersunk screws may be arranged in pairs or in each case threefold. The embodiment as per FIG. 9 makes it possible to save structural space so as not to restrict the angular mobility of the system and keep the structural size and the risk of injury owing to protruding screw heads as small as possible.

It can also be seen from the illustration in FIG. 9 that the first double-walled pipe end 80 and the outer part 48 of the double-walled attachment 46 are joined together by means of a floating mounting 90, 92. The mounting of a double-walled pipe is realized in axially floating fashion between two double-walled connectors 10. At the contact point between a first double-walled pipe end 80 against a double-walled connector 10, the first double-walled pipe end 80 slides in radially guided fashion by means of the seals 58, 60, 62. The perforated disc 70 serves as a stop. For this axially floating mounting 90, 92, use is preferably made of three seals for transmitting the bending moment and thus protecting the first double-walled pipe end 80 against kinking.

It can be seen from the sectional illustration in FIG. 9 that the second clamping ring 30 illustrated therein comprises an encircling stop surface 98 for an angular stop at maximum angular deflection. In the presence of this maximum angular deflection, there is a resulting spacing between the first ball head 20 and the double-walled connector on the opposite side, denoted in FIG. 9 by reference designations 100. The second clamping ring 30 abuts, at position 102, against the angular stop on the second ball head 26, or on the sleeve projection thereof, whereby the maximum deflection of the arrangement is defined and limited.

As illustrated above on the basis of the figures, it is possible by means of the solution proposed according to the invention, with the aid of the fluid-tight connection between the ball heads 20, 26 and the ball cages 52, 54, for angular compensation to be realized in all planes for double-walled connectors 10 with permanently constant uniform deformation of sealing rings 58, 60, 62, 64 with minimum and maximum angular mobility of ±8° and for greater individual-part tolerances and assembly tolerances of the complete assembly. This is assisted by the fact that said sealing rings 58, 60, 62, 64 are positioned between two pairs of ball heads 20, 26 and ball cages 52, 54, which are all arranged concentrically with respect to one another.

The two sealing and/or guide rings 64, 88, which are formed with a smaller diameter than the second ball heads 26 and are positioned with an axial spacing to one another in relation thereto, are, during the installation process, braced axially toward one another by reduction of their spacing, and effect the concentric positioning of the second ball cage 54 in relation to the second ball head 26. In this case, the second guide ring 88 has no sealing function. The second guide ring 88 could also be omitted if the two clamping rings 28 and 30 are manufactured from a material with sliding characteristics.

The first sealing ring 58 is formed with an identical diameter to the first ball heads 20 and is centred axially relative thereto, such that optimum leak-tightness is ensured with maximum individual tolerance and maximum assembly tolerance with angular compensation in the event of deviations of the concentricity of the first and second ball heads 20, 26 in relation to one another. A resulting axial deviation of the concentricity between the first ball cage 52 in relation to the first ball head 20 has, in the case of this arrangement of the first sealing ring 58, only a geometrical effect on the functional spacing of the seal surfaces, and influences the sealing function only to an inconsiderable extent.

It is to be pointed out that the second ball head 26 is axially adjustable relative to the double-walled connector 10 by means of a thread arrangement 94, 96, and thus permits the optimum centring in relation to the first ball head 20. In the diagrammatic illustration, the setting of the second ball head 26 relative to the double-walled connector 10 in an end position of the axial stop between the second clamping ring 30 and the second ball head 26 is illustrated. Owing to the illustration in the end position, the possibility of the setting is difficult to visualize; in the illustrated case, the setting can only expand in one direction, but cannot contract. This may be either directly integrated into the double-walled connector 10, that is to say formed on the latter, or be joined as a separate component to said double-walled connector. The second ball head may be equipped with one or more radially distributed apertures for the transmission of the tightening torque in a minimum structural space.

The second ball cage 54 is axially movable in a floating mounting 90, 92 relative to the clamping rings 28, 30. In this way, an optimum axial preload of the two outer sealing and/or guide rings 64, 88 in the centring of the second ball cage 54 relative to the second ball head 26 is realized. The first and second clamping rings 28, 30 for the optimum axial preload of the two outer sealing and/or guide rings 64, 88, for the centring of the second ball cage 54 relative to the second ball head 26 are to be pre-installed as individual parts between the second ball head 26 and the double-walled connector 10 during the installation of the second ball head 26 on the double-walled connector 10, because the smallest clear inner diameter of the first and second clamping rings 28, 30 for their function of the axial preloading of the two sealing and/or guide rings 64, 88 must be smaller than the greatest outer diameter of the second ball head 26. The first and second clamping rings 28, 30, comprising two or more radially separate segments, may also be pre-installed retrospectively on the double-walled connector 10. The number of segments however gives rise to a correspondingly increased risk of failure compared with the risk of failure exhibited by a clamping ring 28, 30 of closed design.

The positioning of the first ball cage 52 in relation to the first ball head 20 on the double-walled connector 10 is realized by means of the fixed connection or integration of an inner angle arm relative to an outer angle arm, which itself, with the second ball cage 54 with the two sealing or guide rings 64, 88, which are braced axially relative to one another, received therein, is centred relative to the second ball head 26. The expression "angle arm" is to be understood to mean the combination comprising a first ball head. 20, a second ball head 26 together with clamping rings 28, 30 and the securing means 84, and all sealing rings and/or guide rings 58, 64, 56, 62 and 60. "Angle arm" is accordingly to be understood to mean the number of components that moves jointly during an angular movement of a double-walled pipe 72, 74, but does not move conjointly axially during a movement of the pipe ends 80, 82. Since the second ball head 26 is positioned in axially adjustable fashion concentrically with respect to the first ball head 20, this likewise applies to all other elements of the double-walled angular compensation by means of the first and second ball cages 52, 54 and the said sealing rings 58, 60, 62, 64. The solution according to the invention permits a transmission of bending moments from double-walled pipes 72, 74 to the double-walled connector 10 via multiple sealing rings 58, 60, 62, 64 which have an axial offset, and which likewise permit sealed length compensation over an axial clearance with abutment for the end of the pipe in the angle arm. The sealed length compensation is performed owing to the floating mounting 90, 92 between a double-walled pipe end 80 and a corresponding attachment 46 of double-walled form. Here, the sealing rings 58, 60, 62, 64, which have an axial offset in relation to one another, perform the sealing, whilst the stated components can move relative to one another.

Securing of the second ball head 26 in relation to the double-walled connector 10 is realized by means of one or more securing elements (for example one or more fixing screws 44) which are installed in the body of the double-walled connector 10. Securing of the first and second clamping rings 28, 30 to the double-walled attachments 46 is realized by means of one or more radial securing elements 84, designed for example as countersunk screws. The securing means 84, designed for example as countersunk screws, secure the clamping rings 28, 30 relative to the double-walled attachments 46. The first clamping ring 28 and the double-walled attachment 46 assigned thereto, and the second clamping ring 30 and the double-walled attachment 46 assigned thereto, are connected to one another by means of the fine threads 94, 96. The securing means 84, designed preferably as countersunk screws, prevent an adjustment of the internal/external threads 94, 96 relative to one another, which determines the axial preload of the fourth sealing ring 64, situated at the outside, and of the second guide ring 88 in relation to the second ball head 26 situated at the outside.

The invention is not restricted to the exemplary embodiments described here and to the aspects highlighted therein. Rather, numerous modifications which lie within the abilities of a person skilled in the art are possible within the range specified by the claims.

LIST OF REFERENCE DESIGNATIONS

10 Double-walled connector
12 First flow cross section
14 Second flow cross section
16 Fastening element
18 Further fastening element
20 First ball head (inner)
22 Centreline
24 Fastening portion for 16, 18
26 Second ball head (outer)
28 First clamping ring
30 Second clamping ring
32 1st angular offset
34 Stop
36 Axial securing means (fastening element 16, fixing screw 44)
38
40 opening
42 Fastening opening for fastening to structural component
44 Fixing screw
46 Double-walled attachment
48 Outer part
50 Inner part
52 First ball cage (inner)
54 Second ball cage (outer)
55 Insertion space
56 First guide ring
58 First sealing ring
60 Second sealing ring
62 Third sealing ring
64 Fourth sealing ring
66 Groove in the first ball cage 52
68 Grooves for sealing rings
70 Perforated disc
72 First double-walled pipe
74 Second double-walled pipe
76 Line offset 78 2nd angular offset/diversion (doubled with 32)
80 First double-walled pipe end
82 Second double-walled pipe end
84 Securing means (countersunk screw)
86 Channel bundle (aligned with perforated disc 70)
88 Second guide ring
90 Floating connection between double-walled pipe 92 }- end 80, 82 and double-walled attachment 46
94 External thread of double-walled connector 10 (fine thread)
96 Internal thread of second ball head 26, sleeve projection (fine thread)
98 Encircling stop surface of the clamping ring for angular stop
100 Spacing between first ball head 20 and double-walled connector 10
102 Angular stop of the clamping ring 30

The invention claimed is:

1. Device having a double-walled connector and double-walled attachments for connecting pipe ends of double-walled pipes for angular compensation and for length compensation in the event of relative movements of the pipes relative to the double-walled connector, wherein, on the double-walled connector, there are arranged first and second ball heads which are each sealingly engaged over by ball cages rotatably in all planes, which ball cages are formed on the double-walled attachments for receiving double-walled pipe ends which are displaceable axially therein, characterized in that the second ball heads are arranged on the outer circumference of the double-walled connector so as to be adjustable in an axial direction by means of an external/internal thread.

2. Device according to claim 1, characterized in that the first and second ball heads are positioned concentrically on the double-walled connector.

3. Device according to claim 1, characterized in that the first ball heads are formed on the double-walled connector.

4. Device according to claim 1, characterized in that a first and a second clamping ring are pre-installed, so as to engage over the second ball heads on the double-walled connector.

5. Device according to claim 4, characterized in that the first and the second clamping ring have internal diameters smaller than external diameters of the second ball heads.

6. Device according to claim 4, characterized in that the first and the second clamping ring are manufactured from a material which has sliding characteristics, chosen among: PolyEtherEtherKetone (PEEK), Polyamide 6.6 (PA66), PolyTetraFluoroEthylen (PTFE)-coated material, in order to replace a positioned seal with guide function.

7. Device according to claim 4, characterized in that the first and the second clamping ring are of closed design in a circumferential direction or have two or more segments which are radially separate from one another.

8. Device according to claim 4, characterized in that the double-walled connector is manufactured from aluminium, the second ball heads are manufactured from titanium, the first and second clamping rings and the double-walled attachments are manufactured from PolyEtherEtherKetone (PEEK).

9. Device according to claim 4, characterized in that, in a joined state of an outer part of the double-walled attachment and of the first and second clamping ring, an encircling surface on the clamping rings limits angular offsets of the double-walled pipe ends uniformly in encircling fashion.

10. Device according to claim 1, characterized in that the double-walled attachments have an outer part and an inner part.

11. Device according to claim 10, characterized in that a first ball cage is formed with a first sealing ring positioned concentrically with respect to the first ball head, in the inner part, and the second ball cage is equipped with two elements which are axially offset for the concentric positioning of the second ball head, with a fourth sealing ring and with a second guide ring in the outer part.

12. Device according to claim 10, characterized in that a first guide ring and, spaced apart axially therefrom, a second sealing ring are arranged on the outer circumference of the inner part.

13. Device according to claim 10, characterized in that, in a joined state of the outer part and the inner part, a perforated disc arranged on the inner part delimits an axial insertion space for double-walled pipe end.

14. Device according to claim 10, characterized in that the second ball cages, arranged so as to be axially offset with respect to the second ball heads by means of a fourth sealing ring and a second guide ring with smaller diameter than the second ball heads for concentric positioning, are mutually axially braced with respect to the second ball heads.

15. Device according to claim 1, characterized in that the first ball cages receive in each case one first sealing ring which has a diameter identical to the diameter of the first ball head and which compensates deviations in the concentricity of the second ball head in relation to the first ball heads.

16. Device according to claim 1, characterized in that the first and second clamping rings preload a fourth sealing ring and the second guide ring in the axial direction and centre the second ball cages in relation to the second ball cages.

* * * * *